US012570834B2

(12) United States Patent
Lee et al.

(10) Patent No.: US 12,570,834 B2
(45) Date of Patent: Mar. 10, 2026

(54) ANISOTROPIC CONDUCTIVE FILM AND DISPLAY DEVICE COMPRISING SAME

(71) Applicant: LG DISPLAY CO., LTD., Seoul (KR)

(72) Inventors: Yoonjong Lee, Paju-si (KR); Doohee Jang, Paju-si (KR); Kitae Seo, Paju-si (KR); Jinseok Sung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/785,176

(22) Filed: Jul. 26, 2024

(65) Prior Publication Data

US 2025/0092227 A1 Mar. 20, 2025

(30) Foreign Application Priority Data

Sep. 18, 2023 (KR) ........................ 10-2023-0123608

(51) Int. Cl.

| | |
|---|---|
| ***C08K 5/544*** | (2006.01) |
| ***C08K 3/105*** | (2018.01) |
| ***C08K 3/11*** | (2018.01) |
| ***C08K 3/36*** | (2006.01) |
| ***C08K 5/3475*** | (2006.01) |
| ***C08K 7/16*** | (2006.01) |
| ***C09D 5/08*** | (2006.01) |
| ***C09D 5/24*** | (2006.01) |
| ***C09D 163/00*** | (2006.01) |

(52) U.S. Cl.
CPC ............ *C08K 5/5477* (2021.01); *C08K 3/105* (2018.01); *C08K 3/11* (2018.01); *C08K 3/36* (2013.01); *C08K 5/3475* (2013.01); *C08K 7/16* (2013.01); *C09D 5/08* (2013.01); *C09D 5/24* (2013.01); *C09D 163/00* (2013.01)

(58) Field of Classification Search
None
See application file for complete search history.

(56) References Cited

U.S. PATENT DOCUMENTS

2002/0146647 A1 10/2002 Aoki et al.
2005/0256230 A1 11/2005 Yamaguchi et al.
2007/0213429 A1 * 9/2007 Cheng .................... C09J 163/00 523/458
2019/0300810 A1 10/2019 Kouno et al.
2021/0174987 A1 * 6/2021 Naruhashi ............... C08L 25/14
2023/0261203 A1 8/2023 Arai et al.

FOREIGN PATENT DOCUMENTS

| | | | | |
|---|---|---|---|---|
| CN | 1646657 A | 7/2005 | | |
| CN | 112384994 A | 2/2021 | | |
| JP | 2002167569 A | 6/2002 | | |
| JP | 2013020721 A | 1/2013 | | |
| JP | 2021057189 A | 4/2021 | | |
| JP | 2021177452 A | 11/2021 | | |
| KR | 10-2001-0030285 A | 4/2001 | | |
| KR | 20090053161 A | * | 5/2009 | .............. C08L 83/04 |
| KR | 10-2019-0113613 A | 10/2019 | | |
| WO | 2008/130955 A1 | 10/2008 | | |
| WO | WO 2008130995 A1 | * | 10/2008 | ............... H01B 1/22 |
| WO | 2016/063941 A1 | 4/2016 | | |
| WO | 2022085046 A1 | 4/2022 | | |

OTHER PUBLICATIONS

Extended European Search Report dated Jan. 27, 2025 issued in corresponding European Patent Application No. 24193266.4.
Office Action issued in corresponding Taiwanese Patent Application No. 113131421 dated May 21, 2025.
Office Action issued in corresponding Japanese Patent Application No. 2024-104781 dated Jun. 17, 2025.

* cited by examiner

*Primary Examiner* — Khanh T Nguyen
(74) *Attorney, Agent, or Firm* — Morgan, Lewis & Bockius LLP

(57) ABSTRACT

An anisotropic conductive film containing a compound represented by Chemical Formula 1:

[Chemical Formula 1]

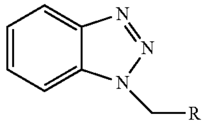

in Chemical Formula 1,
R is any one of a halogen element, a hydroxy group, a substituted or unsubstituted imine group, a substituted or unsubstituted silyl group, a substituted or unsubstituted C1 to C10 oxy group, a substituted or unsubstituted carbonyl group, a substituted or unsubstituted C2 to C10 alkenyl group, and a substituted or unsubstituted C2 to C10 alkynyl group.

14 Claims, No Drawings

ANISOTROPIC CONDUCTIVE FILM AND DISPLAY DEVICE COMPRISING SAME

CROSS REFERENCE TO RELATED APPLICATION

The present application claims the benefit of and the priority to Korean Patent Application No. 10-2023-0123608, filed on 18 Sep., 2023 in the Korean Intellectual Property Office, the disclosure of which is hereby incorporated by reference in its entirety.

BACKGROUND

1. Technical Field

The present disclosure relates to an anisotropic conductive film and a display device including the same.

2. Description of the Related Art

Display devices include devices for displaying image signals. Examples of the display devices include all devices for displaying image signals input from the outside in addition to a television, a computer monitor, a PDA, a smart device for which demand has recently exploded, etc.

A display device may include a display panel and a printed circuit board for driving the display device, and an anisotropic conductive film (ACF), etc. is used to electrically connect the printed circuit board with the display panel.

When the display panel is contaminated with electrolyte, etc., metal components of the panel may corrode in a high temperature and high humidity environment, thereby causing screen defects in the display device. There is a need for a technology to solve such a problem.

SUMMARY

Some example embodiments of the present disclosure may be directed to preventing or minimizing screen defects of a display device by preventing or minimizing the corrosion of a display panel.

Some example embodiments of the present disclosure may be directed to providing an anisotropic conductive film capable of preventing or minimizing the corrosion of the display panel. The objects of the present disclosure are not limited to the above-described object, and other objects and advantages of the present disclosure which are not mentioned may be understood by the following description and more clearly understood by embodiments of the present disclosure. In addition, it may be easily seen that the objects and advantages of the present disclosure may be achieved by means and combinations thereof which are described in the claims.

To achieve these and other advantages and in accordance with objects of the disclosure, as embodied and broadly described herein, an anisotropic conductive film includes a compound represented by Chemical Formula 1:

[Chemical Formula 1]

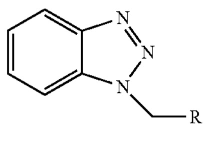

in Chemical Formula 1,

R is any one of a halogen, a hydroxy group, a substituted or unsubstituted imine group, a substituted or unsubstituted silyl group, a substituted or unsubstituted C1 to C10 oxy group, a substituted or unsubstituted carbonyl group, a substituted or unsubstituted C2 to C10 alkenyl group, and a substituted or unsubstituted C2 to C10 alkynyl group.

According to some example embodiments of the present disclosure, R may be represented by any one of a halogen, a hydroxy group, a substituted or unsubstituted imine group, a substituted or unsubstituted C2 to C10 alkenyl group, a substituted or unsubstituted C2 to C10 alkynyl group, a substituted or unsubstituted silyl group represented by Chemical Formula R-1, a substituted or unsubstituted oxy group represented by Chemical Formula R-2, and a substituted or unsubstituted carbonyl group represented by Chemical Formula R-3:

[Chemical Formula R-1]

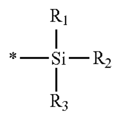

$R_1$, $R_2$, and $R_3$ are each independently any one of hydrogen, deuterium, a substituted or unsubstituted C1 to C10 alkyl group, a substituted or unsubstituted C2 to C10 alkenyl group, a substituted or unsubstituted C2 to C10 alkynyl group, an unsubstituted C6 to C10 aryl group, a substituted or unsubstituted C3 to C10 heteroaryl group, and a substituted or unsubstituted C3 to C10 heterocyclyl group.

$*—O—R_4$ [Chemical Formula R-2]

$R_4$ is any one of a substituted or unsubstituted C1 to C10 alkyl group, a substituted or unsubstituted C2 to C10 alkenyl group, a substituted or unsubstituted C2 to C10 alkynyl group, a substituted or unsubstituted C6 to C10 aryl group, a substituted or unsubstituted C3 to C10 heteroaryl group, and a substituted or unsubstituted C3 to C10 heterocyclyl group.

[Chemical Formula R-3]

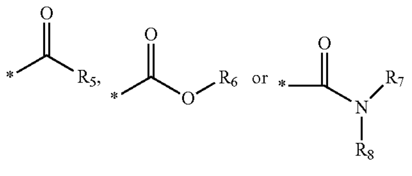

$R_5$, $R_6$, $R_7$, and $R_8$ are, each independently, any one of hydrogen, deuterium, a substituted or unsubstituted C1 to C10 alkyl group, a substituted or unsubstituted C2 to C10 alkenyl group, a substituted or unsubstituted C2 to C10 alkynyl group, a substituted or unsubstituted C6 to C10 aryl group, a substituted or unsubstituted C3 to C10 heteroaryl group, and a substituted or unsubstituted C3 to C10 heterocyclyl group.

According to some example embodiments of the present disclosure, the anisotropic conductive film may further include a binder resin, a cationic polymerizable resin, and conductive particles.

According to some example embodiments of the present disclosure, the anisotropic conductive film may include, with respect to a total weight of solids in the anisotropic conductive film, the binder resin in a range of from 10 to 70 wt %, the cationic polymerizable resin in a range of from 1 to 45 wt %, the conductive particle in a range of from 10 to 35 wt %, and the compound represented by Chemical Formula 1 in a range of from 0.1 to 10 wt %.

According to some example embodiments of the present disclosure, the anisotropic conductive film may further include an inorganic filler.

According to some example embodiments of the present disclosure, the anisotropic conductive film may further include a cationic polymerization initiator.

According to some example embodiments of the present disclosure, R may be any one of a halogen, a hydroxy group, a substituted or unsubstituted imine group, a substituted or unsubstituted silyl group, a substituted or unsubstituted C1 to C10 alkoxy group, a substituted or unsubstituted C1 to C10 carbonyl group, a substituted or unsubstituted C2 to C10 alkenyl group, and a substituted or unsubstituted C2 to C10 alkynyl group.

According to some example embodiments of the present disclosure, the binder resin may include a phenoxy-based binder, an epoxy resin, and a polycondensate of bisphenol diglycidyl ether and bisphenol fluorene.

According to some example embodiments of the present disclosure, the cationic polymerizable resin may include a cyclic aliphatic diepoxide monomer, a trimethylolpropane oxetane monomer, a bisphenol A monomer, a cyclic aliphatic monomer, and a tetrafunctional cyclic aliphatic monomer.

According to some example embodiments of the present disclosure, the conductive particles may include gold and nickel.

According to another aspect of the disclosure, an anisotropic conductive film includes a compound represented by Chemical Formula 1:

[Chemical Formula 1]

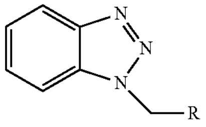

in Chemical Formula 1, R is a substituted or unsubstituted trialkylsilyl group.

According to some example embodiments of the present disclosure, R may be an unsubstituted trimethylsilyl group.

According to some example embodiments of the present disclosure, the anisotropic conductive film may further include: a binder resin, a cationic polymerizable resin, conductive particles, an inorganic filler, and a cationic polymerization initiator.

According to some example embodiments of the present disclosure, the anisotropic conductive film may include, with respect to a total weight of solids in the anisotropic conductive film: the binder resin in a range of from 10 to 70 wt %, the cationic polymerizable resin in a range of from 1 to 45 wt %, the conductive particles in a range of from 10 to 35 wt %, and the compound represented by Chemical Formula 1 in a range of from 0.3 to 5 wt %.

According to some example embodiments of the present disclosure, the inorganic filler may include fumed silica, and the cationic polymerization initiator may include a borate salt.

According to yet another aspect of the present disclosure, a display device includes the anisotropic conductive film as disclosed herein.

According to the present disclosure, by providing the anisotropic conductive film containing the compound represented by Chemical Formula 1, it may be possible to prevent or minimize the corrosion of the display panel, thereby preventing or minimizing the screen defects of the display device. The compound represented by Chemical Formula 1 may form a chemical bond such as a coordination bond between an unshared electron pair of the nitrogen atom in the compound and the metal surface layer of the display panel, and/or a hydrogen bond between the compounds represented by Chemical Formula 1 chemically bonded to the metal surface layer of the display panel, etc., thereby blocking the contact between various electrolyte ions causing corrosion and the display panel. Therefore, the compound represented by Chemical Formula 1 may perform the rust preventive action of preventing or minimizing the corrosion of the display panel.

[Chemical Formula 1]

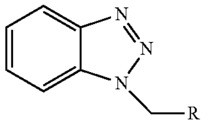

in Chemical Formula 1,

R is any one of a halogen, a hydroxy group, a substituted or unsubstituted imine group, a substituted or unsubstituted silyl group, a substituted or unsubstituted C1 to C10 oxy group, a substituted or unsubstituted carbonyl group, and a substituted or unsubstituted C2 to C10 unsaturated alkyl group.

According to some example embodiments, the anisotropic conductive film may include the compound represented by Chemical Formula 1 in which R is represented by any one of a halogen, a hydroxy group, a substituted or unsubstituted imine group, a substituted or unsubstituted C2 to C10 unsaturated alkyl group, a substituted or unsubstituted silyl group represented by Chemical Formula R-1, a substituted or unsubstituted oxy group represented by Chemical Formula R-2, and a substituted or unsubstituted carbonyl group represented by Chemical Formula R-3. In some example embodiments of the present disclosure, the anisotropic conductive film containing the compound represented by Chemical Formula 1, the reaction between the compound represented by Chemical Formula 1 and the cationic polymerizable resin may be minimized, thereby further improving the adhesion and mechanical properties of the anisotropic conductive film and further improving the corrosion resistance of the display panel.

[Chemical Formula R-1]

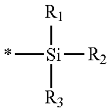

$R_1$, $R_2$, and $R_3$ are each independently any one of hydrogen, deuterium, a substituted or unsubstituted C1 to C10 alkyl group, and a substituted or unsubstituted C6 to C10 aryl group.

*—O—$R_4$ [Chemical Formula R-2]

$R_4$ denotes a substituted or unsubstituted C1 to C10 alkyl group or a substituted or unsubstituted C6 to C10 aryl group.

[Chemical Formula R-3]

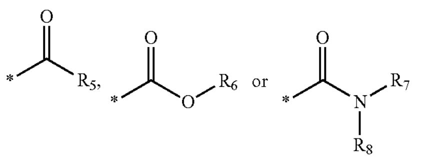

$R_5$, $R_6$, $R_{73}$, and $R_8$ are each independently any one of hydrogen, deuterium, a substituted or unsubstituted C1 to C10 alkyl group, and a substituted or unsubstituted C6 to C10 aryl group.

The compound represented by Chemical Formula 1 according to the present disclosure is added to the anisotropic conductive film and may improve the corrosion resistance of the display panel without degrading the adhesion and mechanical properties of the anisotropic conductive film.

DETAILED DESCRIPTION

Advantages and features of the present disclosure, and a method of achieving the advantages and features will become apparent with reference to the example embodiments described herein in detail together with the accompanying drawings. The present disclosure should not be construed as limited to the example embodiments as disclosed below, and may be embodied in various different forms. Thus, these example embodiments are set forth to make the present disclosure sufficiently complete, and to assist those skilled in the art to fully understand the scope of the present disclosure. The protected scope of the present disclosure is defined by claims and their equivalents.

Further, where the detailed description of the relevant known steps and elements may obscure an important point of the present disclosure, a detailed description of such known steps and elements may be omitted. Furthermore, in the following detailed description of the present disclosure, numerous specific details are set forth to provide a sufficiently thorough understanding of the present disclosure. However, it will be understood that the present disclosure may be practiced without these specific details. In other instances, known methods, procedures, components, and circuits have not been described in detail so as not to unnecessarily obscure aspects of the present disclosure.

The terminology used herein is to describe particular aspects and is not intended to limit the present disclosure. As used herein, the terms "a" and "an" used to describe an element in the singular form is intended to include a plurality of elements. An element described in the singular form is intended to include a plurality of elements, and vice versa, unless the context clearly indicates otherwise.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In construing an element or numerical value, the element or the numerical value is to be construed as including an error or tolerance range even where no explicit description of such an error or tolerance range is provided.

In the present specification, where the terms "comprise", "have", "include", and the like are used, one or more other elements may be added unless the term, such as "only" is used. As used herein, the term "and/or" includes a single associated listed item and any and all of the combinations of two or more of the associated listed items. An expression such as "at least one of" when preceding a list of elements may modify the entire list of elements and may not modify the individual elements of the list. The term "at least one" should be understood as including any and all combinations of one or more of the associated listed items. For example, the meaning of "at least one of a first element, a second element, and a third element" encompasses the combination of all three listed elements, combinations of any two of the three elements, as well as each individual element, the first element, the second element, and the third element.

It will be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it may be directly connected to or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present. In the description of the various embodiments of the present disclosure, where positional relationships are described, for example, where the positional relationship between two parts is described using "on", "over", "under", "above", "below", "beside", "next", or the like, one or more other parts may be located between the two parts unless a more limiting term, such as "immediate(ly)", "direct(ly)", or "close(ly)" is used.

Further, as used herein, when a layer, film, region, plate, or the like may be disposed "on" or "on a top" of another layer, film, region, plate, or the like, the former may directly contact the latter or another layer, film, region, plate, or the like may be disposed between the former and the latter. As used herein, when a layer, film, region, plate, or the like is directly disposed "on" or "on a top" of another layer, film, region, plate, or the like, the former directly contacts the latter and another layer, film, region, plate, or the like is not disposed between the former and the latter. Further, as used herein, when a layer, film, region, plate, or the like may be disposed "below" or "under" another layer, film, region, plate, or the like, the former may directly contact the latter or another layer, film, region, plate, or the like may be disposed between the former and the latter. As used herein, when a layer, film, region, plate, or the like is directly disposed "below" or "under" another layer, film, region, plate, or the like, the former directly contacts the latter and another layer, film, region, plate, or the like is not disposed between the former and the latter.

The features of the various embodiments of the present disclosure may be partially or overall combined with each other, and may be variously inter-operated with each other and driven technically as those skilled in the art can sufficiently understand. The embodiments may be implemented independently of each other and may be implemented together in a co-dependent relationship.

As used herein, "embodiments," "examples," "aspects," and the like should not be construed such that any aspect or design as described is superior to or advantageous over other aspects or designs.

Further, the term "or" means "inclusive or" rather than "exclusive or". That is, unless otherwise stated or clear from the context, the expression that "x uses a or b" means any one of natural inclusive permutations.

The terms used in the description below may be general and universal in the relevant art. However, there may be other terms depending on the development and/or change of technology, convention, preference of technicians, etc. Therefore, the terms used in the description below should not be understood as limiting the disclosure, and should be understood as examples of the terms for describing embodiments.

Further, in some example embodiments, a term may be arbitrarily selected by the applicant, and in this case, the detailed meaning thereof will be described in a corresponding description section. Therefore, such terms used in the description below may be understood based on the name of the terms, and the meaning of the terms and the contents throughout the Detailed Description.

Unless otherwise defined in the present disclosure, "substituted" means that at least one of the hydrogen atoms in the compound or group is substituted by one or more substituents selected from a halogen atom (F, Br, Cl, or I), deuterium, a hydroxy group, an alkoxy group (for example, a C1 to C4 alkoxy group), a nitro group, a nitrile group, a cyano group, an azide group, a hydrazino group, a hydrazono group, a carbonyl group, a carbamyl group, a thiol group, an ester group, a carboxyl group or its salt, a sulfonic acid group or its salt, a phosphoric acid or its salt, an alkyl group, a C2 to C20 alkenyl group, a C2 to C20 alkynyl group, a C6 to C30 aryl group, a C7 to C30 arylalkyl group, a C1 to C20 heteroalkyl group, a C3 to C20 heteroarylalkyl group, a C3 to C20 heteroaryl group, a cycloalkyl group, a C3 to C15 cycloalkenyl group, a C6 to C15 cycloalkynyl group, a heterocycloalkyl group, and combinations thereof.

The term "alkyl group" used herein indicates both linear alkyl radicals and branched alkyl radicals. The alkyl group may be unsubstituted or substituted.

The term "cycloalkyl group" used herein indicates cyclic alkyl radicals. Unless otherwise stated, the cycloalkyl group contains 3 to 20 carbon atoms, and may include cyclopropyl, cyclopentyl, cyclohexyl, and the like, and, the cycloalkyl group may be unsubstituted or substituted.

The term "alkenyl group" used herein indicates both linear alkene radicals and branched alkene radicals. Unless otherwise stated, the alkenyl group contains 2 to 20 carbon atoms, and, the alkenyl group may be unsubstituted or substituted.

The term "cycloalkenyl group" used herein indicates cyclic alkenyl radicals, which may be unsubstituted or substituted.

The term "alkynyl group" used herein indicates both linear alkynyl radicals and branched alkynyl radicals. The alkynyl group may be unsubstituted or substituted.

The term "cycloalkynyl group" used herein indicates cyclic alkynyl radicals, which may be unsubstituted or substituted.

The term "arylalkyl group" used herein indicates an alkyl group having an aromatic group as a substituent, and unless otherwise stated, the aralkyl group contains 7 to 60 carbon atoms, and the aralkyl group may be unsubstituted or substituted.

The terms "aryl group", "aromatic group", "aromatic ring", "carbocyclic aromatic group", and "heterocyclic aromatic group" used herein contain a conjugated structure and may include a monocyclic ring or a polycyclic ring. A polycyclic ring may include "a condensed ring," which are two or more rings where two carbons are shared by two adjacent rings. Unless otherwise stated, the aryl group contains 6 to 60 carbon atoms, and the aryl group may be unsubstituted or substituted.

The term "carbocyclic ring group", unless otherwise stated, may be used as the term including all of "cycloalkyl group," "cycloalkenyl group," and "cycloalkynyl group," which are alicyclic ring groups, and "aryl group" (aromatic group), which is an aromatic ring group.

The term "heterocyclyl group" may indicate that at least one carbon atom constituting a cycloalkyl group, a cycloalkenyl group, a cycloalkynyl group, and the like, is substituted by a heteroatom, such as oxygen (O), nitrogen (N), sulfur (S), and etc., and with reference to the above definition, includes a heterocycloalkyl group, a heterocycloalkenyl group, a heterocycloalkynyl group, and the like. Unless otherwise stated, the heterocyclyl group contains 2 to 60 carbon atoms, and the heterocyclic ring group may be unsubstituted or substituted.

The term "heteroaryl group" may indicate that at least one carbon atom constituting an aryl group, and the like, is substituted by a heteroatom, such as oxygen (O), nitrogen (N), sulfur (S), and etc. Unless otherwise stated, the heteroaryl group contains 3 to 20 carbon atoms, and the heteroaryl group may be unsubstituted or substituted.

The terms "alkylsilyl group," "alkoxy group," or "alkylthio group," indicate that the alkyl group is substituted with the silyl group (e.g., —$SiY_3$, where Y may be, for example, a substituted or unsubstituted C1 to C20 alkyl group), the oxygen atom, or the thio group, respectively. The terms "arylsilyl group", "aryloxy group", or "arylthio group" indicate that the aryl group is substituted with the silyl group, the oxygen atom, or the thio group, respectively. And, the alkylsilyl group, the arylsilyl group, the alkoxy group, the aryloxy group, the alkylthio group, and the arylthio group may be unsubstituted or substituted.

As used herein, the term "C1 to C10 oxy group" may include an alkoxy group, an alkenyloxy group, an alkynyloxy group, an aryloxy group, a heteroaryloxy group, and a heterocyclyloxy group.

As used herein, the term "carbonyl group" may include a formyl group, a ketone group, a carboxylic acid group, an alkoxycarbonyl group, and an amide group.

The anisotropic conductive film (ACF) is generally a film-type adhesive in which conductive particles are dispersed in the resin insulating layer and is a polymer film having conductivity in the thickness direction and having electrical anisotropy and adhesion with insulating properties the direction parallel to the film surface. The anisotropic conductive film performs various roles such as adhesion between the display panel and the printed circuit board, electrically connecting the display panel with the printed circuit board, and maintaining insulation between the display panels.

The present disclosure relates to an anisotropic conductive film and a display device including the same. The present disclosure also relates to an anisotropic conductive film capable of preventing or minimizing the corrosion of a display panel electrically connected to the anisotropic conductive film. According to the some example embodiments of the present disclosure, by providing the anisotropic conductive film containing the compound represented by Chemical Formula 1, it may be possible to prevent or minimize the corrosion of the display panel, thereby preventing or minimizing the screen defects of the display device.

The compound represented by Chemical Formula 1 may form a chemical bond such as a coordination bond between an unshared electron pair of the nitrogen atom in the compound and the metal surface layer of the display panel, and/or a hydrogen bond between the compounds represented by Chemical Formula 1 chemically bonded to the metal surface layer of the display panel, etc., thereby blocking the contact between various electrolyte ions causing corrosion and the display panel. Therefore, the compound represented by Chemical Formula 1 may perform the rust preventive action of preventing or minimizing the corrosion of the display panel.

[Chemical Formula 1]

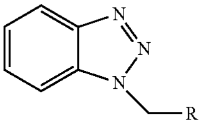

in Chemical Formula 1,

R is any one of a halogen, a hydroxy group, a substituted or unsubstituted imine group, a substituted or unsubstituted silyl group, a substituted or unsubstituted C1 to C10 oxy group, a substituted or unsubstituted carbonyl group, a substituted or unsubstituted C2 to C10 alkenyl group, and a substituted or unsubstituted C2 to C10 alkynyl group.

In some example embodiments, the halogen may be one of F, Cl, Br, and I. In some example embodiments, when R is a halogen, for example, C1, the compound of Chemical Formula 1 may be 1-(chloromethyl)-1H-benzotriazole.

In some example embodiments, when R is a hydroxy group, the compound of Chemical Formula 1 may be 1H-benzotriazole-1-methanol.

In the present disclosure, the imine group indicates a functional group containing a carbon-nitrogen double bond (C═N) and is not particularly limited, but may have 1 to 30 carbon atoms. In the —C═N— group, the nitrogen atom may be bonded to the benzotriazole group in Chemical Formula 1. The imine group may be substituted with an alkyl group, an aryl group, a heterocyclic group, an alkenyl group, a cycloalkyl group, and combinations thereof. Examples of the imine group may include an amidinium group, a guanidinium group, and a cyclic amidine group, but is not limited thereto.

In the present disclosure, the silyl group may be represented by Chemical Formula R-1.

[Chemical Formula R-1]

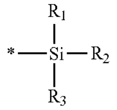

$R_1$, $R_2$, and $R_3$ are each independently any one of hydrogen, deuterium, a substituted or unsubstituted C1 to C10 alkyl group, a substituted or unsubstituted C2 to C10 alkenyl group, a substituted or unsubstituted C2 to C10 alkynyl group, a substituted or unsubstituted C6 to C10 aryl group, a substituted or unsubstituted C3 to C10 heteroaryl group, and a substituted or unsubstituted C3 to C10 heterocyclyl group.

Examples of the silyl group may include a trimethylsilyl group, a triethylsilyl group, a tert-butyldimethylsilyl group, a vinyldimethylsilyl group, a propyldimethylsilyl group, a triphenylsilyl group, a diphenylsilyl group, and a phenylsilyl group, but are not limited thereto. In some example embodiments, R is a silyl group. In some example embodiments, when R is a trimethylsilyl group, the compound of Chemical Formula 1 may be 1-[(trimethylsilyl)methyl]benzotriazole.

In some example embodiments, when the compound represented by Chemical Formula 1 has a silyl group represented by Chemical Formula R-1, it may be possible to further increase the adhesion between the printed circuit board and the display panel and at the same time, further suppress the corrosion of the display panel.

In some example embodiments, the oxy group may be straight chain, branched chain, or cyclic ring chain.

In the present disclosure, the oxy group may be represented by Chemical Formula R-2:

$$*—O—R_4$$ [Chemical Formula R-2]

$R_4$ is any one of a substituted or unsubstituted C1 to C10 alkyl group, a substituted or unsubstituted C2 to C10 alkenyl group, a substituted or unsubstituted C2 to C10 alkynyl group, a substituted or unsubstituted C6 to C10 aryl group, a substituted or unsubstituted C3 to C10 heteroaryl group, and a substituted or unsubstituted C3 to C10 heterocyclyl group.

Examples of the oxy group may include methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, ndecyloxy, benzyloxy, and p-methylbenzyloxy, but are not limited thereto.

In some example embodiments, when the oxy group is a methoxy group, the compound represented by Chemical Formula 1 may be 1-(methoxymethyl)-1H-benzotriazole.

In some example embodiments, the oxy group may be an alkoxy group.

In the present disclosure, the carbonyl group may be represented by Chemical Formula R-3:

[Chemical Formula R-3]

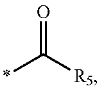 , 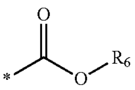 or 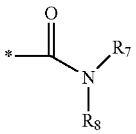

$R_5$, $R_6$, $R_7$, and $R_8$ are each independently any one of hydrogen, deuterium, a substituted or unsubstituted C1 to C10 alkyl group, a substituted or unsubstituted C2 to C10 alkenyl group, a substituted or unsubstituted C2 to C10 alkynyl group, a substituted or unsubstituted C6 to C10 aryl group, a substituted or unsubstituted C3 to C10 heteroaryl group, and a substituted or unsubstituted C3 to C10 heterocyclyl group.

Examples of the carbonyl group may include a formyl group or a ketone group such as an acetyl group, a propionyl group, a propioloyl group, a butanoyl group (butyryl group), an isobutanoyl group (isobutyryl group), a pivaloyl group, a pentanoyl group, a hexanoyl group, an acryloyl group, a methacryloyl group, a crotonoyl group, a heptanoyl group, an octanoyl group, a nonanoyl group, a decanoyl group, a benzoyl group, a 4-methylbenzoyl group, a 3-methylbenzoyl group, a 4-cyanobenzoyl group, a 3-cyanobenzoyl group, a 4-propylbenzoyl group, a 2-ethoxybenzoyl group, or a 4-t-butylbenzoyl group, an alkoxycarbonyl group such as a methoxycarbonyl group, an ethoxycarbonyl group, an n-propoxycarbonyl group, an isopropoxycarbonyl group, an n-butoxycarbonyl group, a t-butoxycarbonyl group, or an amyloxycarbonyl group, an amide group, but are not limited thereto.

In some example embodiments, when the carbonyl group is a benzoyl group, the compound represented by Chemical Formula 1 may be 1-benzoyl-1H-benzotriazole.

In some example embodiments, R is a C1 to C10 carbonyl group.

In the present disclosure, the alkenyl group indicates an unsaturated aliphatic hydrocarbon group containing a double bond, and the alkynyl group indicates an unsaturated aliphatic hydrocarbon group containing a triple bond.

In some example embodiments, when the alkynyl group is a propargyl group, the compound represented by Chemical Formula 1 may be 1-propargyl-1H-benzotriazole.

When using a compound commonly used as a corrosion inhibitor for metals, such as a polyoxyalkenyl-based compound, a silane-based compound, and 1-dodecanethiol in place of the compound represented by Chemical Formula 1 of the present disclosure, electrolyte ions that cause the corrosion of the metal surface layer of the display panel like the compound represented by Chemical Formula of the present disclosure may not be blocked. Therefore, the technical objects to suppress the corrosion of the display panel of the present disclosure may not be achieved. In addition, there is a concern that the adhesion and mechanical properties may be degraded by hindering the curing reaction of the anisotropic conductive film.

When benzotriazole itself is added to the anisotropic conductive film, the curing reaction may be hindered by the benzotriazole bonding with the cationic polymerizable resin, and as a result, there may be a problem that sufficient adhesion and mechanical properties of the anisotropic conductive film may not be achieved. Therefore, there may be a concern that a large amount of surface indentations may occur in elements in the process of attaching the display panel to the printed circuit board, and there may be a concern that the adhesion between the display panel and the printed circuit board may be degraded. On the other hand, since the compound represented by Chemical Formula 1 according to the present disclosure may not react with the cationic polymerizable resin, the compound may have a desirable effect of achieving sufficient adhesion and mechanical properties of the anisotropic conductive film and suppressing the corrosion of the display panel.

By including the above-described compound represented by Chemical Formula 1 in the anisotropic conductive film, it may be possible to suppress the corrosion of the display panel, thereby sufficiently achieving the objects of the present disclosure. Therefore, the composition of the anisotropic conductive film is not particularly limited, but the anisotropic conductive film according to some example embodiments may further include a binder resin, a cationic polymerizable resin, and conductive particles in addition to the above-described compound represented by Chemical Formula 1.

The binder resin of some example embodiments may be added to improve the high temperature rigidity, flowability, adhesion, etc. of the anisotropic conductive film. In some example embodiments, the binder resin may include a polyimide resin, a polyamide resin, a phenoxy resin, a polymethacrylate resin, a polyacrylate resin, a polyurethane resin, a polyester resin, a polyester urethane resin, a polyvinyl butyral resin, a styrene-butyrene-styrene (SBS) resin and an epoxy modified product, a styrene-ethylene-butylene-styrene (SEBS) resin and its modified product, or acrylonitrile butadiene rubber (NBR) and its hydrogenated product, an epoxy resin and copolymers of a bisphenol-type epoxy compound and a fluorene-based compound, which are used alone or in combination, but is not limited thereto.

Non-limiting examples of the bisphenol-type epoxy compound may include a bisphenol A-type epoxy compound, a bisphenol F-type epoxy compound, a bisphenol AD-type epoxy compound, a bisphenol E-type epoxy compound, a bisphenol S-type epoxy compound, or combinations thereof. In some example embodiments, the bisphenol A-type epoxy compound or the bisphenol F-type epoxy compound may be used.

The fluorene-based compound may be used without limitation as long as it is a compound containing a fluorene structure in the molecular structure and may contain two or more hydroxy groups for copolymerization with the bisphenol-type epoxy compound.

Non-limiting examples of the epoxy resin may include a bisphenol-type epoxy compound such as a bisphenol A-type epoxy resin, a bisphenol A-type epoxy acrylate resin, a bisphenol F-type epoxy resin, a bisphenol AD-type epoxy resin, a bisphenol E-type epoxy resin, or a bisphenol S-type epoxy resin, an aromatic epoxy compound such as a polyglycidyl ether epoxy resin, a polyglycidyl ester epoxy resin, or a naphthalene epoxy resin, an alicyclic epoxy compound, a novolak-type epoxy compound such as a cresol novolac epoxy resin or a phenol novolac epoxy resin, a glycidyl amine-based epoxy compound, a glycidyl ester-based epoxy compound, a biphenyl diglycidyl ether epoxy compound, etc.

In some example embodiments, a glass transition temperature Tg of the binder resin may be in the range of 80° C. or higher or 90° C. or higher and may be 220° C. or lower or 200° C. or lower. In some example embodiments, the glass transition temperature Tg of the binder resin may be in the range of 80 to 200° C. or 90 to 200° C. In the range of the glass transition temperature Tg, it may be possible to improve the flowability of the anisotropic conductive film containing the binder resin, thereby increasing capture rates of conductive particles and further improving the mechanical property.

In some example embodiments, a polymerization average molecular weight Mw of the binder resin may be in the range of 30,000 to 100,000, or in the range of 50,000 to 100,000. Within the above range, it may be possible to further improve the mechanical properties of the anisotropic conductive film containing the binder resin.

In some example embodiments, a number average molecular weight Mn of the binder resin may be in the range of 10,000 to 20,000, or in the range of 10,000 to 18,000. Within the above range, it may be possible to further improve the mechanical properties of the anisotropic conductive film containing the binder resin.

The cationic polymerizable resin in some example embodiments may be added to improve the adhesion of the anisotropic conductive film and may include any one of a monomer, oligomer, or polymer having an epoxy group.

Monomers having the epoxy group may include polyfunctional three-membered cyclic ethers, such as cycloaliphatic diepoxide, trimethylolpropane oxetane, bisphenol A, and cycloaliphatic epoxide or a polyfunctional 4-membered cyclic ether, such as tetra-functional cycloaliphatic oxetane, but are not limited thereto. The monomers having the epoxy group may be used individually or in combination of two or more types.

The cationic polymerizable resin according to some example embodiments may be provided by being polymerized through a cationic polymerization initiator. The cationic polymerization initiator crosslinks the epoxy resins by ring-opening the epoxy group at the end of the epoxy resin. Examples of the cationic polymerization initiators may include aromatic sulfonium salts, aromatic diazonium salts, iodonium salts, phosphonium salts, selenium salts, borate salts, etc., but are not limited thereto. In some example embodiments, the cationic polymerization initiator may be an aromatic sulfonium salt, and the aromatic sulfonium salt may have desirable reactivity at low temperatures and have a longer available time.

The glass transition temperature Tg of the cationic polymerizable resin in some example embodiments may be 100° C. or higher, 120° C. or higher, 130° C. or higher, 250° C. or lower, or a value between the above values. The cationic polymerizable resin having the above range of the glass transition temperature Tg may have improved curability and/or viscosity and have further improved trapping properties of conductive particles.

An equivalent weight of the cationic polymerizable resin in some example embodiments may be 80 or more, 90 or more, 250 or less, 230 or less, or a value between the above values. The cationic polymerizable resin having the above range of the equivalent weight may have improved curability and/or viscosity.

In some example embodiments, the conductive particles may be any conductive particles commonly used as conductive particles of the anisotropic conductive film. Examples of the conductive particles may include metal particles, metal-covered particles, conductive polymer particles, etc.

In some example embodiments, an average particle diameter of the conductive particles may be 0.5 μm or more, 1 μm or more, 1.5 μm or more, 2 μm or more, 50 μm or less, 30 μm or less, 20 μm or less, 10 μm or less, 5 μm or less, or a value between the above values in consideration of conductivity. In some example embodiments, the average particle diameter of the conductive particles may be in the range of 0.5 to 50 μm, 1 to 30 μm, 1.5 to 20 μm, 2 to 10 μm, or 2 to 5 μm, but is not limited thereto.

In some example embodiments, the strength of the conductive particle may be 5000 $N/mm^2$ or more, 6000 $N/mm^2$ or more, 7000 $N/mm^2$ or more, 10000 $N/mm^2$ or less, or a value between the above values in consideration of the mechanical properties such as the strength, elasticity, etc. of the anisotropic conductive film.

Examples of the metal particles may include gold, silver, copper, palladium, aluminum, nickel, iron, titanium, manganese, zinc, tungsten, platinum, lead, and tin alone or in combination of two or more types, but are not limited thereto.

Examples of the metal-coated particles may include particles in which the surface of a resin particle such as an acrylic resin or an epoxy resin is coated with a metal or particles in which the surface of an inorganic particle such as glass or ceramic is coated with a metal, but are not limited thereto.

Examples of the conductive polymer particles may include carbon, polyacetylene nanoparticles, polypyrrole nanoparticles, etc., but are not limited thereto.

The anisotropic conductive film may include the binder resin at 10 to 70 wt %, the cationic polymerizable resin at 1 to 45 wt %, the conductive particle at 10 to 35 wt %, and the compound represented by Chemical Formula 1 at 0.1 to 10 wt % with respect to the total weight of solids of the anisotropic conductive film according to some example embodiments, and it may be possible to further improve the corrosion resistance of the display panel electrically connected to the anisotropic conductive film in the above range.

According to some example embodiments of the present disclosure, an anisotropic conductive film for further improving curability and/or viscosity may contain the cationic polymerizable resin at 2 to 40 wt %, 3 to 35 wt %, or 5 to 30 wt % with respect to the total weight of solids of the anisotropic conductive film.

According to some example embodiments of the present disclosure, an anisotropic conductive film for further improving the mechanical properties may contain the cationic polymerizable resin at 10 to 30 wt %, 15 to 30 wt %, or 15 to 25 wt % with respect to the total weight of solids of the anisotropic conductive film.

According to some example embodiments of the present disclosure, an anisotropic conductive film for further suppressing the corrosion of the display panel may include the compound represented by Chemical Formula 1 at 0.2 to 10 wt %, 0.25 to 10 wt %, 0.3 to 10 wt %, 0.5 to 10 wt %, 0.1 to 8 wt %, 0.2 to 8 wt %, 0.25 to 8 wt %, 0.3 to 8 wt %, 0.5 to 8 wt %, 0.1 to 5 wt %, 0.2 to 5 wt %, 0.25 to 5 wt %, or 0.3 to 5 wt % with respect to the total weight of solids of the anisotropic conductive film.

The anisotropic conductive film according to the present disclosure may be manufactured according to the typical method of manufacturing the anisotropic conductive film in the relevant technical field, and there are no restrictions on the manufacturing method. As a non-limiting example of the method of manufacturing the anisotropic conductive film, a binder resin, a cationic polymerizable resin, an inorganic filler, a compound represented by Chemical Formula 1, conductive particles, and a cationic polymerizable initiator may be added to a mixer sequentially or simultaneously and stirred. Thereafter, the anisotropic conductive film may be provided by discharging the stirred product to a coater, drying the product, and then through processing such as winding or drying, but is not limited thereto.

The anisotropic conductive film according to the present disclosure may further include a cationic polymerization initiator, an inorganic filler, a curing agent, a plasticizer, an ultraviolet stabilizer, an antioxidant, a coloring agent, a reinforcing agent, or a filler, as desired, and the composition is not particularly limited.

The inorganic filler may control the fluidity of the anisotropic conductive film and adjust a particle capture rate.

Non-limiting examples of the inorganic filler may include silica, humed silica, talc, titanium oxide, calcium carbonate, magnesium oxide, etc.

As an example, a specific surface area of the inorganic filler may be 50 $m^2/g$ or more, 80 $m^2/g$ or more, 300 $m^2/g$ or less, 250 $m^2/g$ or less, or a value between the above values, but is not limited thereto.

As an example, an average particle diameter of the inorganic filler may be 1 nm or more, 1.5 nm or more, 2 nm or more, 3 nm or more, 200 nm or less, 150 nm or less, 120 nm or less, or a value between the above values, but is not limited thereto.

Examples and comparative examples of the present disclosure are described below. However, the following examples are only examples of the present disclosure, and the present disclosure is not limited to the following examples.

Example

Manufacturing of Anisotropic Conductive Film

The binder resin at 10 to 70 wt %, the cationic polymerizable resin at 1 to 45 wt %, the conductive particle at 10 to 35 wt %, and the compound represented by Chemical Formula 1 at 0.1 to 10 wt % with respect to the total weight of solids were input to the mixer, and additionally, as an inorganic filler, fumed silica having a specific surface area of 220 $m^2/g$, fumed silica having a specific surface area of 110 $m^2/g$, silica having a diameter of 0.1 μm, and a borate initiator as an initiator were input to the mixer and then stirred.

The composition of the binder resin was a phenoxy-based binder (Mw: 60,000, Mn: 16,000, and Tg: 98° C.) at 15 to 20 wt %, a polymer epoxy resin (Mw: 80,000, Mn: 12,000, and Tg: 150° C.) at 50 to 60 wt %, and a polycondensation binder of bisphenol diglycidyl ether and bisphenol fluorene (Mw: 80,000, Mn: 13,000, and Tg: 198° C.) at 25 to 40 wt % with respect to the total weight of the binder resin.

The composition of the cationic polymerizable resin was a cyclic aliphatic diepoxide monomer at 5 to 10 wt %, a trimethylolpropane oxetane monomer at 20 to 30 wt %, a bisphenol A monomer at 5 to 10 wt %, a cyclic aliphatic monomer at 15 to 25 wt %, a fast-curing bisphenol A monomer at 10 to 20 wt %, and a tetrafunctional cyclic aliphatic monomer at 15 to 25 wt % with respect to the total weight of the cationic polymerizable resin.

Gold-nickel plated polymer balls were used as conductive particles.

An anisotropic conductive film was manufactured by filtering the stirred product, applying the discharged crude solution onto the film using a bar coater, and drying the film in an oven.

In the example and comparative examples, anisotropic conductive films were manufactured under the same conditions except for the type of additive compound. The content of the additive compound, the type and content of other compositions, etc. were all the same. The types of additive compounds added to the anisotropic conductive films of example and comparative examples are as follows.

Example 1: 1-[(trimethylsilyl)methyl]benzo-triazole

Comparative Example 1: Not added

Comparative Example 2: polyoxyalkenyl series (WAcorrG50 by ECHEMI)

Comparative Example 3: silane series (WACorrSilCX2 by ECHEMI)

Comparative Example 4: polyoxyalkenyl series (WSCorr-G50-Zi by ECHEMI)

Comparative Example 5: polyoxyalkenyl series (WSCorr-Cu-0100 by ECHEMI)

Comparative Example 6: benzotriazole

Comparative Example 7: 1-dodecanthiol

Manufacturing of Evaluation Sample

To evaluate whether the manufactured anisotropic conductive film can suppress the corrosion of the display panel, an evaluation sample was manufactured under the following conditions. After contaminating the display panel made of copper with NaCl 0.9% salt water and fingerprints, the contaminated display panel and printed circuit board were bonded using the anisotropic conductive films of example and comparative examples manufactured and then cured under the condition of 130° C. and 70 MPa for 5 seconds.

The physical properties, etc. of each evaluation sample were evaluated under the following conditions.

1. Corrosion Resistance Evaluation

After arranging an evaluation sample in a chamber with high temperature (60° C.) and high humidity (90%), the time required for corrosion to occur was measured to evaluate corrosion resistance as follows.

Corrosion occurrence time of 300 hours or less: failure (X)

Corrosion occurrence time of over 300 hours and 600 hours or less: normal (Δ)

Corrosion occurrence time of over 600 hours: excellent (o)

2. Curing Rate Evaluation

The curing rate of the evaluation sample was evaluated under the bonding condition of 130° C. and 70 MPa.

3. Surface Property Evaluation

The indentation level of the evaluation sample was evaluated under the bonding condition of 130° C. and 70 MPa. A state in which the most indentations occurred was evaluated as 1, and the state in which the least indentations occurred was evaluated as 5.

4. Bubbling Level

The bubbling level of the evaluation sample was checked under the bonding condition of 130° C. and 70 MPa.

Large amount of occurrence: Strong

Medium amount of occurrence: Medium

Small amount of occurrence: Weak

The evaluation results of examples and comparative examples are summarized in Table 1.

TABLE 1

| | Corrosion resistance | Curing rate | Surface property | Bubbling |
|---|---|---|---|---|
| Example 1 | ○ | 78.7 | 4 | Not occurred |
| Comparative Example 1 | X | 78.4 | 5 | Not occurred |
| Comparative Example 2 | X | 80.0 | 4 | Medium |
| Comparative Example 3 | X | 79.6 | 4 | Weak |
| Comparative Example 4 | X | 70.4 | 2 | Medium |
| Comparative Example 5 | X | 65.6 | 2 | Weak |
| Comparative Example 6 | ○ | 9.4 | 1 | Strong |
| Comparative Example 7 | Δ | 77.2 | 4 | Weak |

Example and comparative examples are evaluated with reference to Table 1.

In Example 1 that satisfies some example embodiments of the present disclosure, the corrosion resistance of the display panel was significantly improved, and despite the addition of the additive compound, the curing rate was not reduced compared to Comparative Example 1 in which the additive compound was not added, and thus the surface property was good and bubbling did not occur.

In Comparative Example 1, the corrosion of the display panel occurred for a short time because the additive compound according to the present disclosure for improving corrosion resistance was not added.

The additive compounds of Comparative Examples 2 to 5 were known as being corrosion inhibitor components for improving corrosion resistance, but the corrosion resistance of the display panel was not improved because they could not block electrolyte ions that cause the corrosion of the metal surface layer of the display panel. In addition, in Comparative Examples 4 and 5, the additive compound inhibited the curing reaction of the anisotropic conductive film to generate bubbles, the curing rate of the anisotropic conductive film was reduced compared to Example 1, and the mechanical properties were degraded, resulting in the occurrence of many indentations, etc. in the surface.

In Comparative Example 6, the corrosion resistance of the display panel was improved, but the curing reaction was significantly impeded and thus the curing rate was 9.4%. A large amount of bubbles were generated, and the mechanical properties were degraded, resulting in the most indentations. In addition, the adhesion between the display panel and the printed circuit board was degraded because the curing rate was too low, and the capturing ability of the conductive particles of the anisotropic conductive film was also degraded.

In Comparative Example 7, the corrosion resistance was slightly improved, but the improvement in corrosion resistance was smaller than that of Example 1, and the curing reaction of the anisotropic conductive film was slightly inhibited, resulting in the generation of a small amount of bubbles, and resulting in the degradation of the mechanical properties.

The effects obtainable from the present disclosure are not limited to the above-described effects, and other effects that are not mentioned will be clearly understood by those skilled in the art to which the present disclosure pertains from the following description.

Although embodiments of the present disclosure have been described with reference to the accompanying drawings, the present disclosure is not limited to the above embodiments and may be modified in a various manner within the scope of the technical spirit of the present disclosure. Accordingly, the embodiments as disclosed in the present disclosure are intended to describe rather than limit the technical idea of the present disclosure, and the scope of the technical idea of the present disclosure is not limited by these embodiments. Therefore, it should be appreciated that the embodiments as described above is not restrictive but illustrative in all aspects.

What is claimed is:

1. An anisotropic conductive film comprising:

a binder resin;

a cationic polymerizable resin;

conductive particles; and a compound represented by Chemical Formula 1:

[Chemical Formula 1]

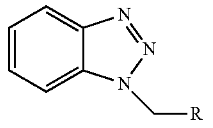

in Chemical Formula 1,

R is any one of a halogen, a hydroxy group, a substituted or unsubstituted imine group, a substituted or unsubstituted silyl group, a substituted or unsubstituted C1 to C10 oxy group, a substituted or unsubstituted carbonyl group, a substituted or unsubstituted C2 to C10 alkenyl group, and a substituted or unsubstituted C2 to C10 alkynyl group, wherein the compound represented by Chemical Formula 1, the binder resin, the cationic polymerizable resin, and the conductive particles are uniformly dispersed in the anisotropic conductive film.

2. The anisotropic conductive film of claim 1, wherein R is represented by any one of a halogen, a hydroxy group, a substituted or unsubstituted imine group, a substituted or unsubstituted C2 to C10 alkenyl group, a substituted or unsubstituted C2 to C10 alkynyl group, a substituted or unsubstituted silyl group represented by Chemical Formula R-1, a substituted or unsubstituted oxy group represented by Chemical Formula R-2, and a substituted or unsubstituted carbonyl group represented by Chemical Formula R-3:

[Chemical Formula R-1]

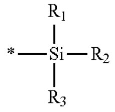

$R_1$, $R_2$, and $R_3$ are each independently any one of hydrogen, deuterium, a substituted or unsubstituted C1 to C10 alkyl group, a substituted or unsubstituted C2 to C10 alkenyl group, a substituted or unsubstituted C2 to C10 alkynyl group, an unsubstituted C6 to C10 aryl group, a substituted or unsubstituted C3 to C10 heteroaryl group, and a substituted or unsubstituted C3 to C10 heterocyclyl group, $*\!-\!O\!-\!R_4$ [Chemical Formula R-2]

$R_4$ is any one of a substituted or unsubstituted C1 to C10 alkyl group, a substituted or unsubstituted C2 to C10 alkenyl group, a substituted or unsubstituted C2 to C10 alkynyl group, a substituted or unsubstituted C6 to C10 aryl group, a substituted or unsubstituted C3 to C10 heteroaryl group, and a substituted or unsubstituted C3 to C10 heterocyclyl group, and

[Chemical Formula R-3]

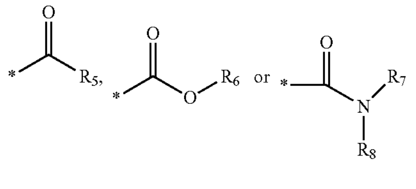

$R_5$, $R_6$, $R_7$, and $R_8$ are each independently any one of hydrogen, deuterium, a substituted or unsubstituted C1 to C10 alkyl group, a substituted or unsubstituted C2 to C10 alkenyl group, a substituted or unsubstituted C2 to C10 alkynyl group, a substituted or unsubstituted C6 to C10 aryl group, a substituted or unsubstituted C3 to C10 heteroaryl group, and a substituted or unsubstituted C3 to C10 heterocyclyl group.

3. The anisotropic conductive film of claim 1, comprising, with respect to a total weight of solids in the anisotropic conductive film:

the binder resin in a range of from 10 to 70 wt %, the cationic polymerizable resin in a range of from 1 to 45 wt %, the conductive particles in a range of from 10 to 35 wt %, and the compound represented by Chemical Formula 1 in a range of from 0.1 to 10 wt %.

4. The anisotropic conductive film of claim 1, further comprising an inorganic filler.

5. The anisotropic conductive film of claim 1, further comprising a cationic polymerization initiator.

6. The anisotropic conductive film of claim 1, wherein R is any one of a halogen, a hydroxy group, a substituted or unsubstituted imine group, a substituted or unsubstituted silyl group, a substituted or unsubstituted C1 to C10 alkoxy group, a substituted or unsubstituted C1 to C10 carbonyl group, a substituted or unsubstituted C2 to C10 alkenyl group, and a substituted or unsubstituted C2 to C10 alkynyl group.

7. The anisotropic conductive film of claim 1, wherein the binder resin includes a phenoxy-based binder, an epoxy resin, and a polycondensate of bisphenol diglycidyl ether and bisphenol fluorene.

8. The anisotropic conductive film of claim 1, wherein the cationic polymerizable resin includes a cyclic aliphatic diepoxide monomer, a trimethylolpropane oxetane monomer, a bisphenol A monomer, a cyclic aliphatic monomer, and a tetrafunctional cyclic aliphatic monomer.

9. The anisotropic conductive film of claim 1, wherein the conductive particles include gold and nickel.

10. A display device comprising the anisotropic conductive film of claim 1.

11. An anisotropic conductive film comprising:

a binder resin;

a cationic polymerizable resin;

conductive particles;

an inorganic filler;

a cationic polymerization initiator; and a compound represented by Chemical Formula 1:

[Chemical Formula 1]

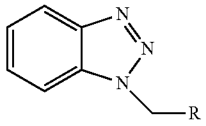

in Chemical Formula 1,

R is a substituted or unsubstituted trialkylsilyl group, wherein the compound represented by Chemical Formula 1, the binder resin, the cationic polymerizable resin, the conductive particles, the inorganic filler, and the cationic polymerization initiator are uniformly dispersed in the anisotropic conductive film.

12. The anisotropic conductive film of claim 11, wherein R is an unsubstituted trimethylsilyl group.

13. The anisotropic conductive film of claim 11, comprising, with respect to a total weight of solids in the anisotropic conductive film:

the binder resin in a range of from 10 to 70 wt %, the cationic polymerizable resin in a range of from 1 to 45 wt %, the conductive particles in a range of from 10 to 35 wt %, and the compound represented by Chemical Formula 1 in a range of from 0.3 to 5 wt %.

14. The anisotropic conductive film of claim 11, wherein the inorganic filler includes fumed silica, and wherein the cationic polymerization initiator includes a borate salt.

* * * * *